UNITED STATES PATENT OFFICE.

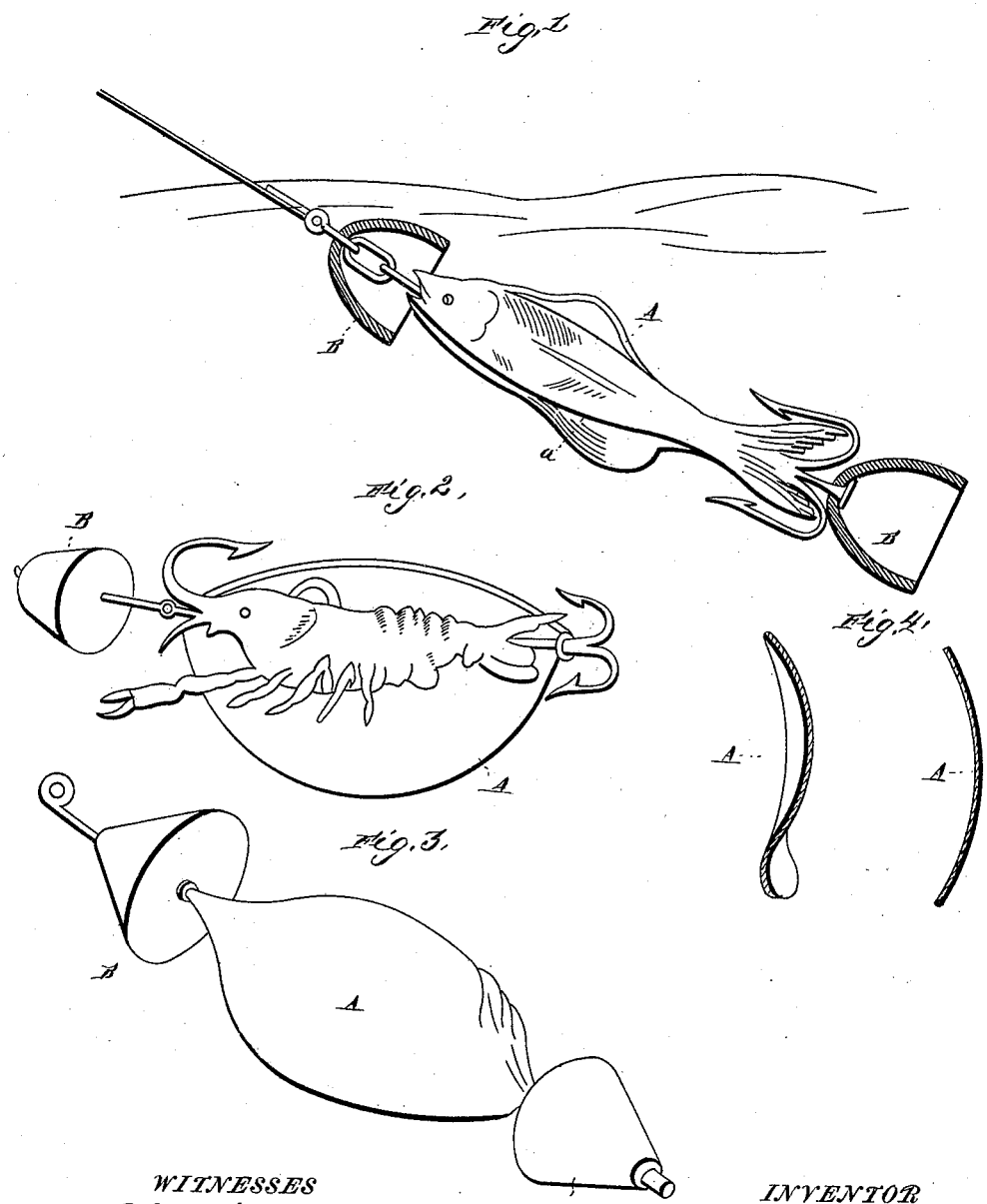

ERNEST F. PFLUEGER, OF AKRON, OHIO.

TROLLING-SPOON.

SPECIFICATION forming part of Letters Patent No. 432,436, dated July 15, 1890.

Application filed March 19, 1889. Serial No. 303,926. (No model.)

*To all whom it may concern:*

Be it known that I, ERNEST F. PFLUEGER, a citizen of the United States, residing at Akron, in the county of Summit and State of Ohio, have invented certain new and useful Improvements in Artificial Fish-Bait; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to trolling-hooks for fishing; and it consists, first, in an improved trolling-spoon having painted or otherwise affixed upon one or both of its sides pictures or representations of some animal or insect suitable for bait, to give it an attractive and enticing appearance, and, second, in placing before the hook or hooks an elastic or flexible shield or protector which extends laterally beyond the points of the hooks to protect the same and prevent them from fouling when drawn through grass or weeds and from catching on logs, roots, or other objects in the water.

In the accompanying drawings, which represent my invention and form a part of this specification, Figures 1, 2, and 3 represent different forms of spoons made to represent different animals, and show also, in section, my shield or protector in connection therewith. Fig. 4 is a cross-sectional view of the spoon.

At different seasons of the year, or in fishing for different varieties of fish, different kinds of bait are required. I therefore propose to place upon the spoon the representation of any animal or insect suitable for the particular season or for the variety of fish desired, and in order to make the device more attractive and deceptive I propose, where the character of the bait to be represented admits of it, to cut out the spoon in the shape of the animal to be represented.

The hooks, as in other trolling-spoons, are attached to the rear end and point forward, and in order to protect the points and to prevent them from catching on logs, roots, or other objects in the water, or from fouling by catching on grass or weeds when drawn through the same, I provide an elastic or flexible shield or protector of such size that it projects out beyond the points of the hooks. When the shield strikes an object in the water, it is deflected and carries with it the hooks, so that they pass the object without catching. The shield or protector is made in any suitable shape, preferably in cup shape, as represented in Figs. 1 and 4, or in cone shape, as represented in Figs. 2 and 3. It may be made solid or hollow, as may be preferred; but I prefer to make it hollow on account of lightness and greater elasticity.

Referring to the drawings by letters of reference, A designates the spoon, which is made of any suitable material (preferably of metal.) It may be concavo-convex or flat, according to its shape in outline. When cut out and formed in the shape of an animal of suitable figure—as, for example, in the shape of a fish—as represented in Fig. 1, it may be twisted to give the desired rotary movement in the water by the action of the latter against the twisted portion. In such case it is sufficient to twist the tail. When made in such shape that it cannot be twisted, I make it concavo-convex, as usual.

B designates the shield or protector, which is made of some suitable elastic material—such as rubber, for example—and of such size that it will project laterally beyond the points of the hooks. It is located somewhat in advance of the hooks, so as not to prevent the fish from reaching the latter, and with its convex side forward, so as to offer the least resistance when drawn through the water. In some cases shields are arranged both in front and in rear of the hooks, as represented in Figs. 1 and 2, but ordinarily one in front will be found sufficient.

It is obvious that the shield will subserve the same purpose whether used in connection with the spoon, as represented in Figs. 1, 2, and 3, or with the hooks alone, as represented in Fig. 4. The latter figure represents an arrangement adapted to catch such varieties of fish as are usually taken with "fly-hooks." The stems of the hooks project into the open end of the shield or protector and are surrounded or covered with feathers of such colors as may serve to attract the particular variety of fish desired, the ends of the feathers projecting from the open end of the shield. The ordinary-prepared fly-hooks may be used in this case. While I show feathers arranged around the stems of the hooks, I desire to state that they may be omitted and the shield be colored or painted to attract the fish.

The shield may be used with the spoon either with or without the feathers, as may be preferred.

Having now described my invention, I claim—

1. The combination, with a trolling-hook, of an elastic or flexible shield or protector arranged in front of the hook and extending laterally beyond the point thereof to protect the same and prevent fouling or catching on objects in the water, substantially as shown and described.

2. The combination of a trolling-spoon having hooks attached thereto, of an elastic or flexible shield or protector arranged in front of the spoon and hooks and extending laterally beyond the points of the latter, as and for the purpose set forth.

3. The trolling device herein shown and described, the same consisting of a hollow elastic shield B and one or more hooks having their stems secured within the shield, the latter projecting laterally beyond the points of the hooks, as and for the purpose described.

4. The trolling device herein shown and described, the same consisting of a hollow elastic or flexible shield B, one or more hooks having their stems secured within the shield, the latter projecting laterally beyond the points of the hooks to protect the same, and feathers also secured within the shield and projecting therefrom around the stems of the hooks, substantially as shown and described.

In testimony whereof I affix my signature in presence of two witnesses.

ERNEST F. PFLUEGER.

Witnesses:
T. W. WAKEMAN,
U. L. MARVIN.